United States Patent
Zhang

(10) Patent No.: US 8,555,118 B2
(45) Date of Patent: Oct. 8, 2013

(54) SYSTEM AND METHOD FOR PROCESSING NETWORK DATA OF A SERVER

(75) Inventor: Yu-Gang Zhang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 221 days.

(21) Appl. No.: 13/280,363

(22) Filed: Oct. 25, 2011

(65) Prior Publication Data

US 2013/0024719 A1    Jan. 24, 2013

(30) Foreign Application Priority Data

Jul. 20, 2011   (CN) .......................... 2011 1 0203891

(51) Int. Cl.
*G06F 11/00*    (2006.01)
(52) U.S. Cl.
USPC .......................................................... 714/55
(58) Field of Classification Search
USPC .......................................................... 714/55
See application file for complete search history.

(56) References Cited

U.S. PATENT DOCUMENTS

| | | | |
|---|---|---|---|
| 6,000,040 A * | 12/1999 | Culley et al. | 714/31 |
| 6,026,444 A * | 2/2000 | Quattromani et al. | 709/232 |
| 2003/0204792 A1* | 10/2003 | Cahill et al. | 714/55 |
| 2011/0246833 A1* | 10/2011 | Bockhaus et al. | 714/37 |
| 2012/0124431 A1* | 5/2012 | Bauer et al. | 714/55 |

* cited by examiner

*Primary Examiner* — Bryce Bonzo
(74) *Attorney, Agent, or Firm* — Altis & Wispro Law Group, Inc.

(57) ABSTRACT

In a system and method for processing network data of a server, the server includes a timer, a switch and a storage system. The server determines whether the storage system includes overtime information of the timer when server is powered on. If the storage system includes the overtime information, the overtime information is deleted. If an operating system is started, a predetermined initial value is written into the timer to start timing, and a first network port and a second network port are disconnected through the switch. If the server works normally, a predetermined reset command is sent to the timer to reset the timer at regular intervals. If the server does not work normally, the first network port and the second network port are connected through the switch. If the timer times out, the overtime information is written into the storage system.

18 Claims, 3 Drawing Sheets

SYSTEM AND METHOD FOR PROCESSING NETWORK DATA OF A SERVER

BACKGROUND

1. Technical Field

Embodiments of the present disclosure relate to data process systems and methods, and more particularly to a system and method for processing the network data of a server.

2. Description of Related Art

A plurality of servers may be used to process a large amount of data, especially to process network data. However, if one of the servers does not work normally (e.g., software and/or mechanical failure), the network data being processed by the server may be interrupted, and the network data may be lost or cannot be processed timely. Loss of the network data may influence safety of network data, and processing the network data may not have high efficiency.

DETAILED DESCRIPTION

The disclosure is illustrated by way of example and not by way of limitation in the figures of the accompanying drawings in which like references indicate similar elements. It should be noted that references to an or one embodiment in this disclosure are not necessarily to the same embodiment, and such references mean at least one.

In general, the word module, as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
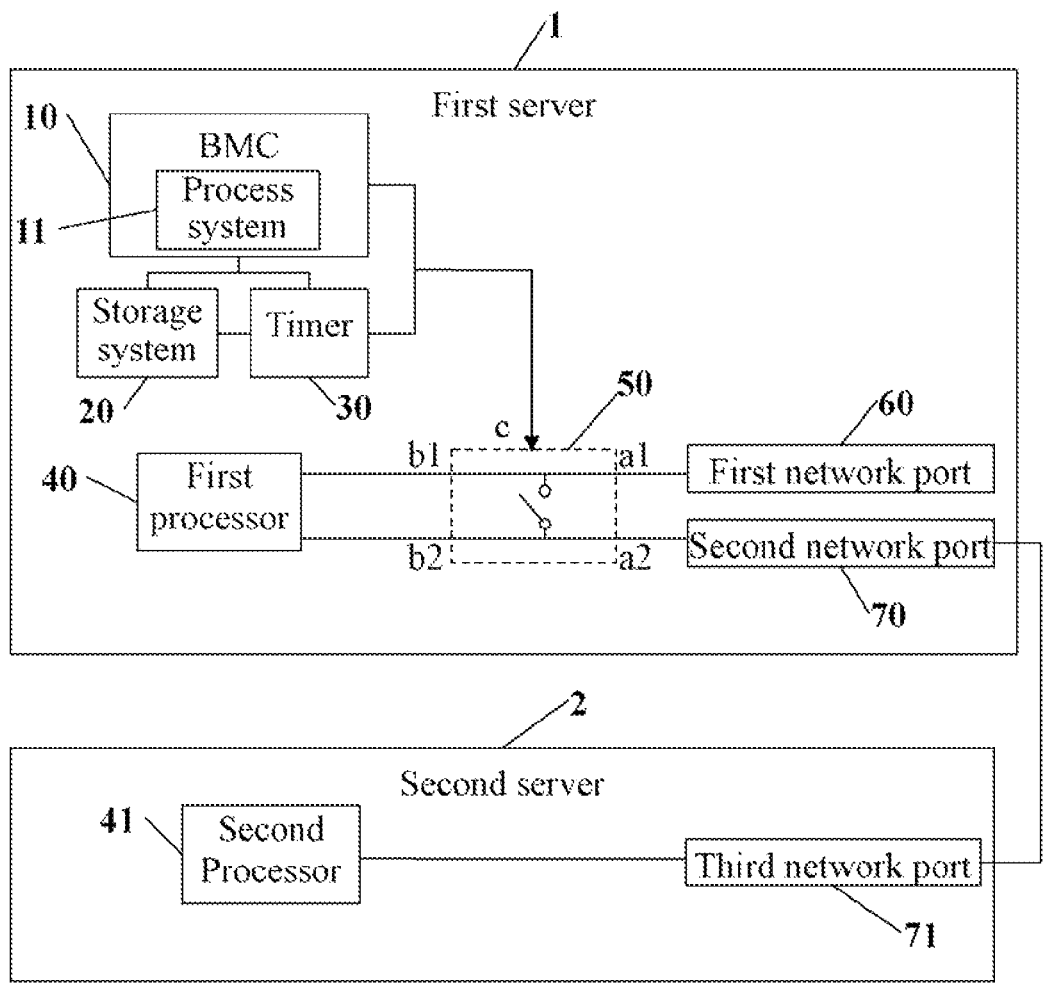
FIG. 1 is a block diagram of one embodiment of a first server including a process system.

FIG. 1 is a block diagram of one embodiment of a first server 1 including a process system 11. In the embodiment, the process system 11 is executed within a Baseboard Management Controller (BMC) 10. The first server 1 further includes a storage system 20, a timer 30, a first processor 40, a switch 50, a first network port 60 and a second network port 70. The first network port 60 is a normal working network interface to transmit network data of the first server 1, and the second network port 70 is a standby network interface to transmit network data of the first server 1. The first processor 40 may acquire and process network data received through the first network port 60 or through the second network port 70. The second network port 70 is connected to a second server 2 by means of a third network port 71. The third network port 71 is the standby network port of the second server 2. A second processor 41 in the second server 2 may acquire and process the network data received through the third network port 71. The process system 11 may control network data processed by the first server 1 to be processed by the second server 2 continuously, if the first server 1 does not work normally.

The BMC 10 may be independent of the first sever 1, that is, the BMC 10 may continue operating even when the first server 1 does not work normally. The storage system 20 stores data for the first server 1, such as, overtime information relating to the timer 30, for example. The overtime information is information that represents the timer 30 timing out, such as the timer 30 timing out, for example. In one embodiment, the storage system 20 may be an electrically erasable read-only memory (EEROM). The timer 30 may be a watchdog timer (WDT) which can issue a reset signal. When the timer 30 times out, the timer 30 may send the reset signal to restart the first server 1.

The switch 50 may have a first input port (denoted as the first input port "a1"), a second input port (denoted as the second input port "a2"), a first output port (denoted as the first output port "b1"), a second output port (denoted as the second output port "b2"), and a control port (denoted as the control port "c"). The first input port "a1" may allow a connection(s) to the first network port 60, and the second input port "a2" may allow a connection(s) to the second network port 70. The first output port "b1" and the second output port "b2" may allow a connection(s) to the first processor 40. The control port "c" is connected to the BMC 10, in such a way that the BMC 10 can control the switch 50. If the BMC 10 outputs a first voltage level to the control port "c", the switch 50 is switched on, and the first network port 60 may connect to the second network port 70. If the BMC 10 outputs a second voltage level to the control port "c", the switch 50 is switched off. In one embodiment, the first voltage level may be a high voltage that represents a logical "1". The second voltage level may be a low voltage that represents a logical "0". The high voltage may be one volt (1V), and the low voltage may be 0V, for example.

Figure 2:
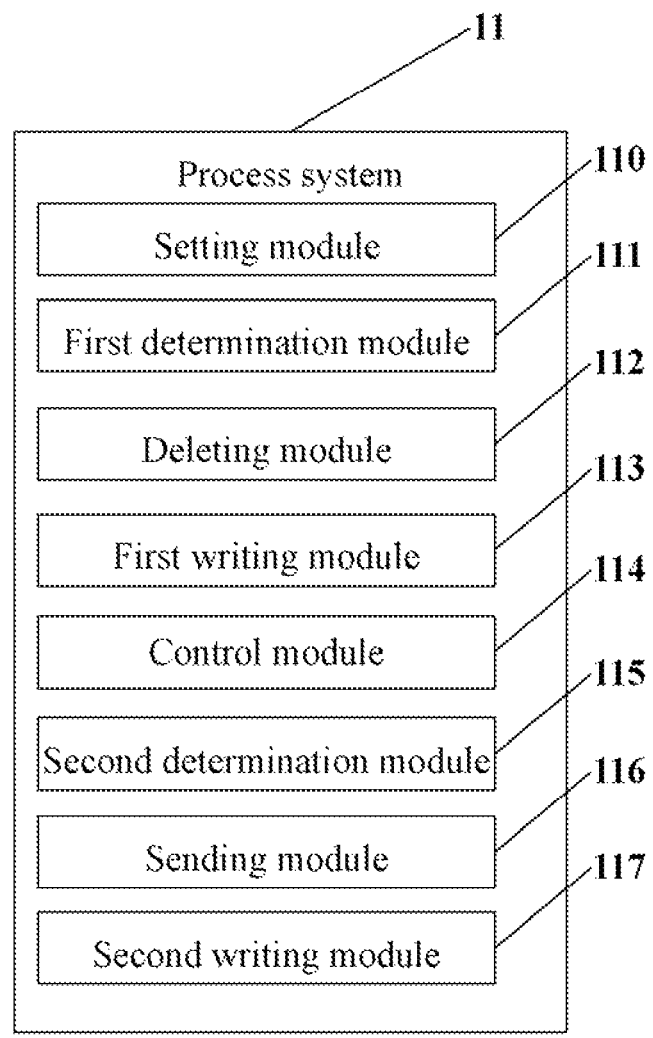
FIG. 2 is a block diagram of function modules of the processing system included in the first server of FIG. 1.

FIG. 2 is a block diagram of function modules of the process system 11 included in the first server 1 of FIG. 1. In the embodiment, the process system 11 may include a setting module 110, a first determination module 111, a deleting module 112, a first writing module 113, a control module 114, a second determination module 115, a sending module 116, and a second writing module 117. The modules 110, 111, 112, 113, 114, 115, 116 and 117 comprise computerized codes in the form of one or more programs that are stored in a memory (not shown in FIG. 1) of the BMC 10. The computerized code includes instructions that are executed by a microprocessor (not shown in FIG. 1) of the BMC 10 to provide functions for the modules. Details of these operations are as follows.

The setting module sets an initial value for the timer 30 and a reset command for resetting the timer 30. In one embodiment, the reset command may be a hotkey input from a keyboard of the first server 1, and the initial value may be set as 0x8000, for example.

The first determination module 111 determines the storage system 20 includes the overtime information of the timer 30 when the first server 1 is powered on. Such overtime information signifies that the timer 30 has timed out (i.e., reached a value of zero nor null).

The deleting module 112 deletes the overtime information from the storage system 20 if the storage system 20 includes the overtime information of the timer 30.

The first writing module 113 writes the initial value into the timer 30 to enable the timer 30 to start timing when an operating system of the first server 1 is started. In one embodiment, the initial value is written into a register of the timer. The timer 30 may generate decrement the initial value by one when a predetermined cycle of the timer 30 ends. If the initial value is decreased to zero, the timer 30 times out. The timer 30 may generate the overtime information, and then send the restart signal to the first server 1 to restart the first server 1.

The control module 114 switches off the switch 50, to disconnect the first network port 60 and the second network port 70, when the initial value is written into the timer 30. In one embodiment, the control module 114 may control the BMC 10 to output the second voltage level to the control port "c" of the switch 50, to switch off the switch 50.

The second determination module 115 determines whether the first server 1 does not work normally. In one embodiment, the second determination module 115 may send a predetermined instruction to the first server 1. If the first server 1 responds to the predetermined instruction within a predetermined time (e.g., 1 second), the second determination module 115 may determine that the first server 1 works normally. If the first server 1 does not respond to the predetermined instruction within the predetermined time, the second determination module 115 may determine that the first server 1 does not work normally.

The sending module 116 sends the reset command to the timer 30 at regular intervals (e.g., 1.5 seconds), if the first server 1 does not work normally. The timer 30 may restart timing to avoid the first server 1 being restarted. If the first server 1 works normally, the sending module 116 may do not send the reset command to the timer 30.

When the first server 1 does not work normally, the control module 114 further controls the switch 50 to be switched on to connect the first network port 60 and the second network port 70. The network data are sent from the first network port 60 to the third network port 71 through the second network port 70, and may be processed by the second processor 41 of the second server 2. In one embodiment, the control module 114 may control the BMC 10 to output the first voltage level to the control port "c" of the switch 50, to switch on the switch 50.

After the first server 1 does not work normally, because the sending module 116 does not send the reset command to the timer 30, the timer 30 continues counting down, and it may time out. When the timer 30 generates the overtime information, the second writing module 117 writes the overtime information into the storage system 20. Then the timer 30 may send the restart signal to restart the first server 1.

Figure 3:
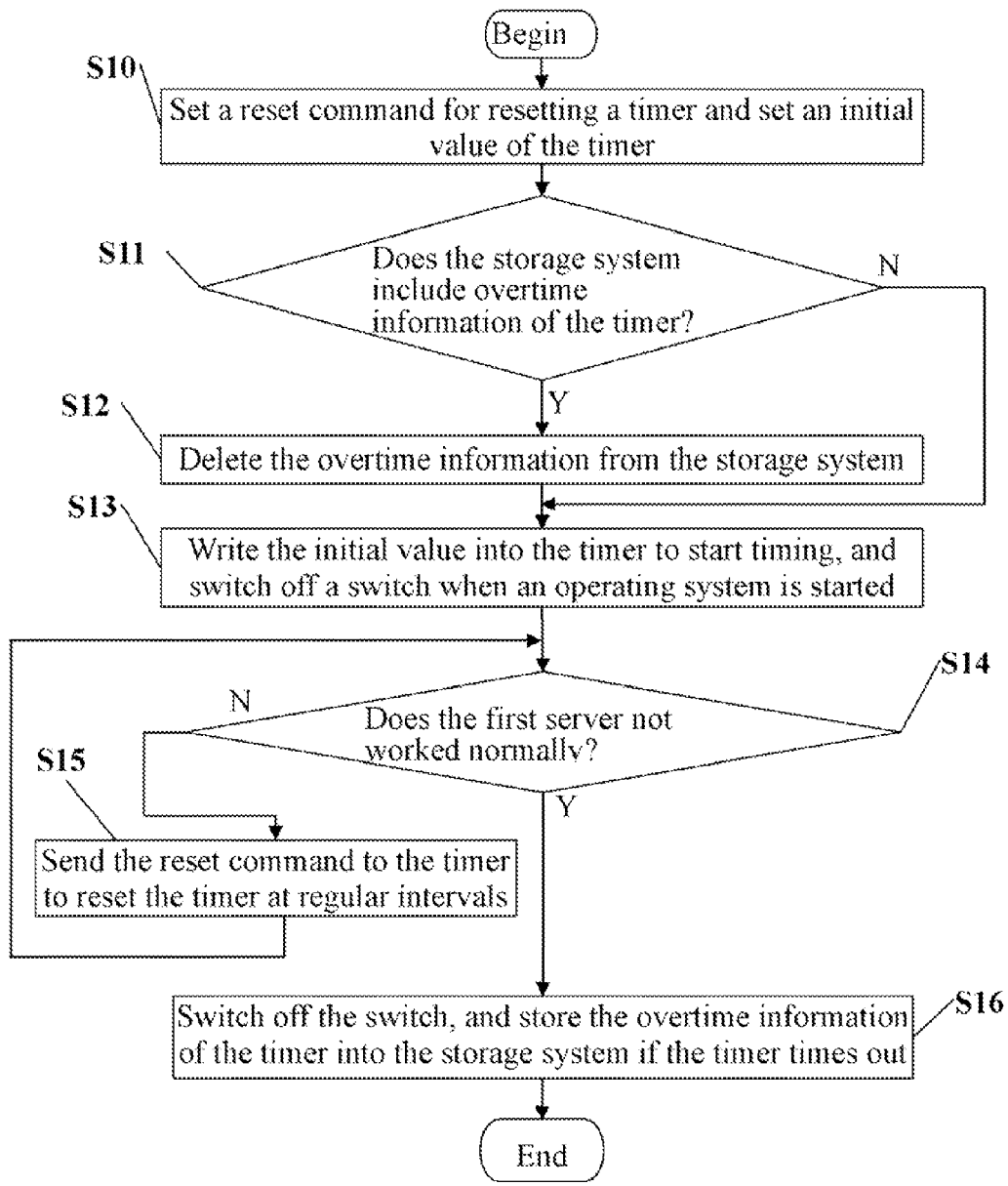
FIG. 3 is a flowchart of one embodiment of a system for processing network data in the first server of FIG. 1.

FIG. 3 is a flowchart of one embodiment of a method for processing network data of the first server 1 of FIG. 1. Depending on the embodiment, additional blocks may be added, others deleted, and the ordering of the blocks may be changed.

In block S10, the setting module 110 sets a reset command for resetting the timer 30, and sets an initial value for the timer 30.

In block S11, the first determination module 111 determines the storage system 20 includes the overtime information of the timer 30, when the first server 1 is powered on. If the storage system 20 includes the overtime information of the timer 30, block S12 is implemented. Otherwise, if the storage system 20 does not include the overtime information of the timer 30, block S13 is implemented.

In block S12, the deleting module 112 deletes the overtime information from the storage system 20.

In block S13, the first writing module 113 writes the initial value into the timer 30 to enable the timer 30 to start timing, when an operating system of the first server is started, and the control module 114 switches off the switch 50, so disconnecting the first network port 60 and the second network port 70.

The control module 114 may control the BMC 10 to output the second voltage level to control port "c" of the switch 50, to switch off the switch 50.

In block S14, the second determination module 115 determines whether the first server 1 does not work normally. If the second determination module 115 determines that the first server 1 does not work normally, block S16 is implemented. Otherwise, if the second determination module 115 determines that the first server 1 works normally, block S15 is implemented.

In block S15, the sending module 116 sends the reset command to the timer 30 at regular intervals, and block S14 is repeated. The timer 30 may restart timing to avoid the first server 1 being restarted. If the first server 1 does not work normally, the sending module 116 does not send the reset command to the timer 30.

In block S16, the control module 114 further controls the switch 50 to be switched on, to connect the first network port 60 and the second network port 70, and if the timer 30 generates the overtime information, the second writing module 117 writes the overtime information into the storage system 20. The network data are sent from the first network port 60 to the third network port 71 through the second network port 70, and may be processed by the second processor 41 of the second server 2. In one embodiment, the control module 114 may control the BMC 10 to output the first voltage level to control port "c" of the switch 50, to switch on the switch 50.

All of the processes described above may be embodied in, and fully automated via, functional code modules executed by one or more general purpose processors of the servers. The code modules may be stored in any type of non-transitory readable medium or other storage device. Some or all of the methods may alternatively be embodied in specialized hardware. Depending on the embodiment, the non-transitory readable medium may be a hard disk drive, a compact disc, a digital video disc, a tape drive or other suitable storage medium.

The described embodiments are merely possible examples of implementations, and have been set forth for a clear understanding of the principles of the present disclosure. Many variations and modifications may be made without departing substantially from the spirit and principles of the present disclosure. All such modifications and variations are intended to be included herein within the scope of this disclosure and the described inventive embodiments, and the present disclosure is protected by the following claims.

What is claimed is:

1. A first server, comprising:
   a timer, a switch, and a storage system;
   a baseboard management controller (BMC); and
   one or more programs that are stored in and executed by the BMC of the server, the one or more programs comprising:
   a first determination module operable to determine whether the storage system comprises overtime information of the timer, in response to the first server being powered on;
   a deleting module operable to delete the overtime information from the storage system in response to the determination if the storage system comprises the overtime information;
   a first writing module operable to write a predetermined initial value into the timer to enable the timer to start timing, upon the condition that an operating system of the first server is started;

a control module operable to disconnect a first network port and a second network port of the first server through the switch when the initial value is written into the timer;

a sending module operable to send a predetermined reset command to the timer to reset the timer at regular intervals, in response to that the first server works normally;

the control module further operable to connect the first network port and the second network port to the switch to process the network data received from the first network port, in response to that the first server does not work normally; and a second writing module operable to write the overtime information into the storage system, in response to that the timer times out and generates the overtime information.

2. The first server as claimed in claim 1, wherein the second network port of the first server is connected to a third network port of a second server, and the third network port connects to a processor of the second server.

3. The first server as claimed in claim 2, wherein the switch comprises:
a first input port that connects to the first network port;
a second input port that connects to the second network port;
a first output port and a second output port, each of the first output port and the second output port that connects to a processor of the first server; and
a control port that connects to the BMC.

4. The first server as claimed in claim 3, wherein the control module connects to the first network port and the second network port by controlling the BMC to output a high level voltage to the control port to switch on the switch, and disconnects the first network port and the second network port by controlling the BMC to output a low level voltage to the control port to switch off the switch.

5. The first server as claimed in claim 4, wherein the high level voltage corresponds to a logical 1, and the low level voltage corresponds to a logical 0.

6. The first server as claim in claim 1, wherein the timer sends a restart signal to restart the first server when the timer times out.

7. A computer-implemented method for processing network data of a first server, the first server comprising a timer, a switch and a storage system (e.g., an electrically erasable read-only memory (EEROM)), the method comprising:
determining whether the storage system comprises overtime information of the timer, in response to the first server being powered on;
deleting the overtime information from the storage system, upon the condition that there is the storage system comprises the overtime information of the timer;
writing a predetermined initial value into the timer to enable the timer to start timing in response to that an operating system of the first server is started;
disconnecting a first network port and a second network port of the first server through the switch when the initial value is written into the timer;
sending a predetermined reset command to the timer to reset the timer at regular intervals, in response to that the first server works normally;
connecting the first network port and the second network port to the switch, to process the network data received from the first network port, in response to that the first server does not work normally; and
writing the overtime information into the storage system, in response to that the timer times out and generates the overtime information.

8. The method as claimed in claim 7, wherein the second network port of the first server is connected to a third network port of a second server, and the third network port connects to a processor of the second server.

9. The method as claimed in claim 8, wherein the switch comprises:
a first input port that connects to the first network port;
a second input port that connects to the second network port;
a first output port and a second output port, each of the first output port and the second output port that connects to a processor of the first server; and
a control port that connects to the BMC.

10. The method as claimed in claim 9, wherein the first network port and the second network port are connected to the switch by controlling the BMC to output a high level voltage to the control port to switch on the switch, and the first network port and the second network port are disconnected through the switch by controlling the BMC to output a low level voltage to the control port to switch off the switch.

11. The method as claimed in claim 10, wherein the high level voltage corresponds to a logical 1, and the low level voltage corresponds to a logical 0.

12. The method as claimed in claim 7, wherein the timer sends the restart signal to restart the first server when the timer times out.

13. A non-transitory storage medium storing a set of instructions, the set of instructions capable of being executed by a baseboard management controller (BMC) of a first server, cause the first server to perform a method for process network data of the first server, the method comprising:
determining whether a storage system of the first server comprises overtime information of a timer of the first server, in response to the first server being powered on;
deleting the overtime information in the storage system, upon the condition that the storage system comprises the overtime information of a timer;
writing a predetermined initial value into the timer to enable the timer to start timing, in response to that an operating system of the first server is started;
disconnecting a first network port and a second network port of the first server through a switch of the first server, when the initial value is written into the timer;
sending a predetermined reset command to the timer to reset the timer at regular intervals, in response to that the first server works normally;
connecting the first network port and the second network port through the switch, to process the network data received from the first network port, in response to that the first server does not work normally;
writing the overtime information into the storage system, in response to that the timer times out and generates the overtime information.

14. The storage medium as claimed in claim 13, wherein the second network port of the first server is connected to a third network port of a second server, and the third network port connects to a processor of the second server.

15. The storage medium as claimed in claim 14, wherein the switch comprises:
a first input port that connects to the first network port;
a second input port that connects to the second network port;
a first output port and a second output port, each of the first output port and the second output port connects to a processor of the first server;
a control port that connect to the BMC.

16. The storage medium as claimed in claim 14, wherein the first network port and the second network port are connected by controlling the BMC to output a high level voltage to the control port, to switch on the switch; and the first network port and the second network port are disconnected by control the BMC to output a low level voltage to the control port, to switch off the switch.

17. The storage medium as claimed in claim 16, wherein the high level voltage corresponds to a logical 1, the low level voltage corresponds to a logical 0.

18. The storage medium as claimed in claim 13, wherein the timer sends the restart signal to restart the first server when the timer times out.

\* \* \* \* \*